US012638908B2

(12) United States Patent (10) Patent No.: US 12,638,908 B2
Steinmetz et al. (45) Date of Patent: May 26, 2026

(54) POWER ENVELOPE MODIFICATION FOR MEMORY SYSTEMS BASED ON TIME TO THERMAL THROTTLE

(71) Applicant: Micron Technology, Inc., Boise, ID (US)

(72) Inventors: Cory M. Steinmetz, Boise, ID (US); Kyle J. Wilkins, Meridian, ID (US); William N. Thanos, Scotts Valley, CA (US); Craig W. Miller, Longmont, CO (US); Royce K. Louis, Bangalore (IN); Roy Leonard, San Jose, CA (US); Suresh Reddy Yarragunta, Bangalore (IN); Chaman Saurav, Bangalore (IN)

(73) Assignee: Micron Technology, Inc., Bosie, ID (US)

( * ) Notice: Subject to any disclaimer, the term of this patent is extended or adjusted under 35 U.S.C. 154(b) by 132 days.

(21) Appl. No.: 18/782,554

(22) Filed: Jul. 24, 2024

(65) Prior Publication Data

US 2025/0208689 A1 Jun. 26, 2025

Related U.S. Application Data

(60) Provisional application No. 63/613,634, filed on Dec. 21, 2023.

(51) Int. Cl.
G06F 1/32 (2019.01)
G06F 1/20 (2006.01)
(Continued)

(52) U.S. Cl.
CPC ............ G06F 1/3275 (2013.01); G06F 1/206 (2013.01); G06F 1/3203 (2013.01)

(58) Field of Classification Search
CPC ...... G06F 1/3275; G06F 1/206; G06F 1/3225; G06F 1/324; G06F 1/3296
(Continued)

(56) References Cited

U.S. PATENT DOCUMENTS 9,244,519 B1 * 1/2016 Ellis ...................... G06F 3/0634
9,760,311 B1 * 9/2017 Amir ...................... G06F 1/3275
(Continued)

OTHER PUBLICATIONS

"International Search Report and Written Opinion of the International Searching Authority," issued in connection with Int'l Appl. No. PCT/US2024/039587, dated Nov. 11, 2024 (9 pages).

*Primary Examiner* — Volvick Derose

(74) *Attorney, Agent, or Firm* — Holland & Hart LLP

(57) ABSTRACT

Methods, systems, and devices for power envelope modification for memory systems based on time to thermal throttle are described. A memory system may dynamically change the power limit based on operating conditions associated with the memory system. For example, the memory system may measure the time before entering a thermal throttle mode. If the time is relatively short, the memory system may decrease the power limit, which may cause the time before entering the thermal throttle mode during a subsequent burst of host activity to increase. Alternatively, if the time is relatively long, the memory system may increase the power limit, which may cause the time before entering the thermal throttle mode during a subsequent burst of host activity to decrease.

20 Claims, 5 Drawing Sheets

(51) Int. Cl.
    *G06F 1/3234*       (2019.01)
    *G06F 1/3203*       (2019.01)

(58) Field of Classification Search
    USPC ........................................................ 713/320
    See application file for complete search history.

(56)               References Cited

U.S. PATENT DOCUMENTS

| | | | |
|---|---|---|---|
| 2004/0260957 A1* | 12/2004 | Jeddeloh ............... | G06F 1/3225 |
| | | | 713/300 |
| 2011/0046804 A1 | 2/2011 | Fong et al. | |
| 2014/0149772 A1* | 5/2014 | Arora .................... | G06F 1/3234 |
| | | | 713/323 |
| 2015/0121057 A1* | 4/2015 | Arora .................... | G06F 1/3287 |
| | | | 713/100 |
| 2015/0301744 A1* | 10/2015 | Kim ...................... | G06F 3/0659 |
| | | | 711/103 |
| 2016/0118130 A1* | 4/2016 | Chadha ................ | G11C 16/225 |
| | | | 365/185.18 |
| 2016/0378149 A1 | 12/2016 | Kam et al. | |
| 2017/0131754 A1 | 5/2017 | Zobel et al. | |
| 2018/0260152 A1* | 9/2018 | Bar ....................... | G06F 3/0688 |
| 2020/0073456 A1 | 3/2020 | Nguyen et al. | |
| 2022/0043586 A1* | 2/2022 | Liang .................... | G06F 3/0625 |
| 2022/0188016 A1* | 6/2022 | Dai ......................... | G06F 3/061 |
| 2022/0301598 A1* | 9/2022 | Eemani .................... | G11C 7/04 |
| 2022/0374059 A1* | 11/2022 | Xiong ................. | G06F 11/3037 |

\* cited by examiner

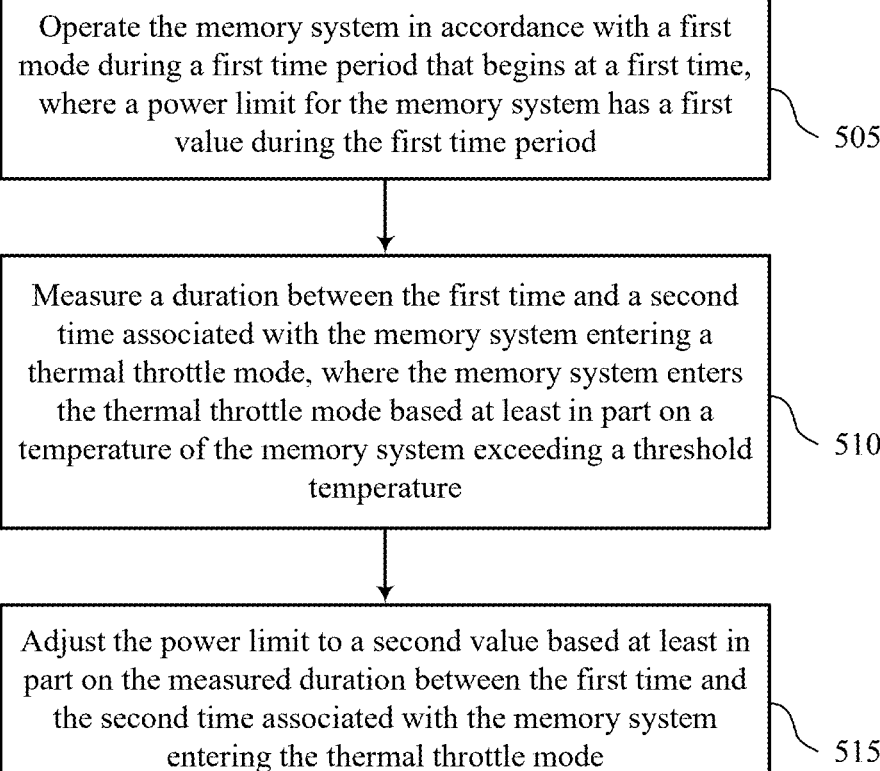

Operate the memory system in accordance with a first mode during a first time period that begins at a first time, where a power limit for the memory system has a first value during the first time period

505

Measure a duration between the first time and a second time associated with the memory system entering a thermal throttle mode, where the memory system enters the thermal throttle mode based at least in part on a temperature of the memory system exceeding a threshold temperature

510

Adjust the power limit to a second value based at least in part on the measured duration between the first time and the second time associated with the memory system entering the thermal throttle mode

POWER ENVELOPE MODIFICATION FOR MEMORY SYSTEMS BASED ON TIME TO THERMAL THROTTLE

CROSS REFERENCE

The present Application for Patent claims priority to U.S. Patent Application No. 63/613,634 by Steinmetz et al., entitled "POWER ENVELOPE MODIFICATION FOR MEMORY SYSTEMS BASED ON TIME TO THERMAL THROTTLE," filed Dec. 21, 2023, which is assigned to the assignee hereof, and which is expressly incorporated by reference in its entirety herein.

TECHNICAL FIELD

The following relates to one or more systems for memory, including power envelope modification for memory systems based on time to thermal throttle.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

BRIEF DESCRIPTION OF THE DRAWINGS

FIG. 5 shows a flowchart illustrating a method or methods that support power envelope modification based on time to thermal throttle in accordance with examples as disclosed herein.

DETAILED DESCRIPTION

Figure 1:
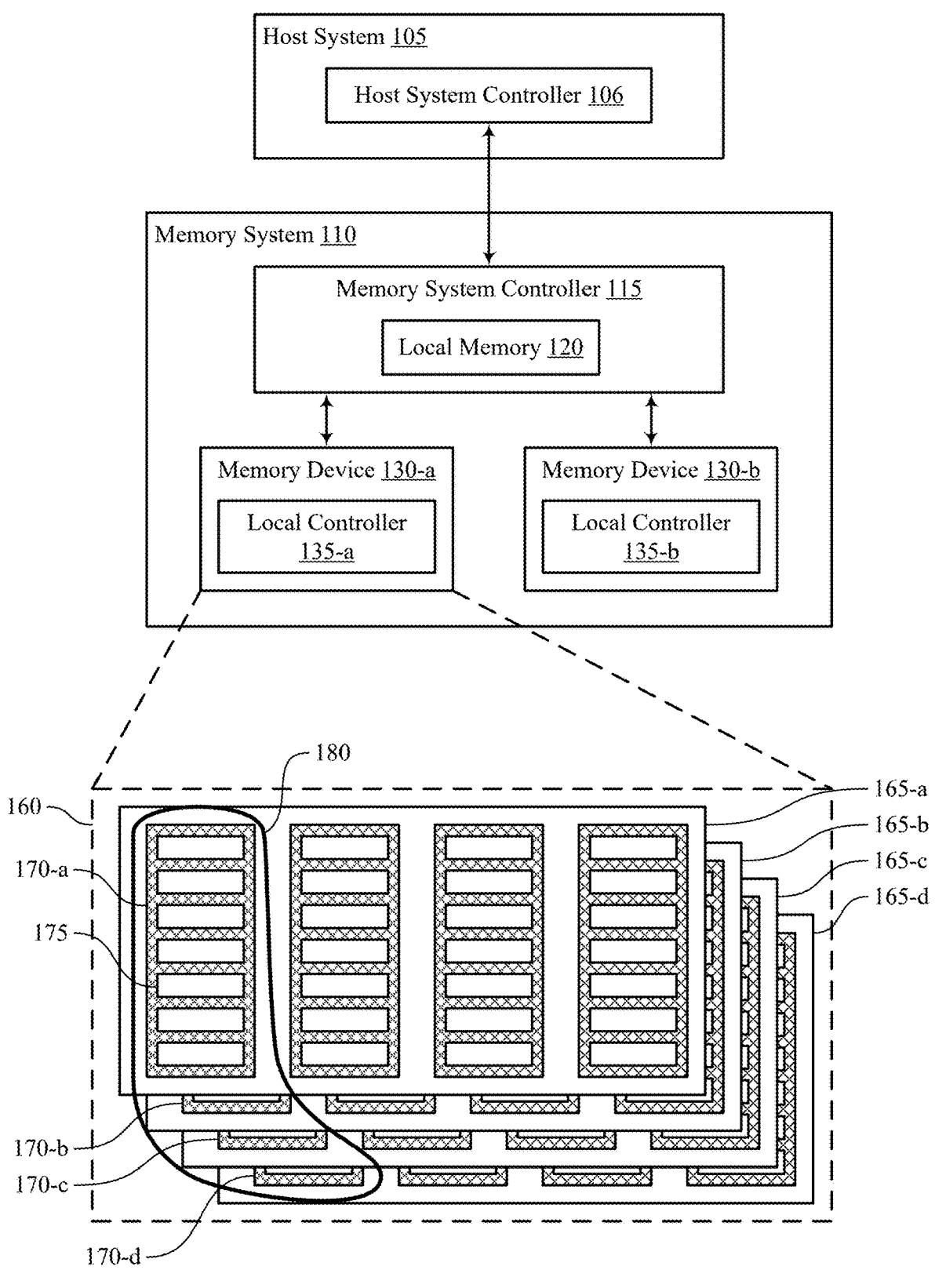
FIG. 1 shows an example of a system that supports power envelope modification based on time to thermal throttle in accordance with examples as disclosed herein.

Some memory systems may operate according to (e.g., may be configured with, such as being coded in firmware) a threshold power level (e.g., a power limit) to improve performance of the memory system. The threshold power level may be an upper limit, for example, of a power envelope for the memory system (e.g., range of allowable power consumption for the memory system, which may in some cases be specific to a particular mode of operation of the memory system). A memory system having a relatively high power limit may experience better performance (e.g., a faster data rate) compared with a memory system having a relatively low power limit. However, as the memory system performs operations (e.g., in response to commands from a hos t device), the temperature of the memory device may increase commensurate with the power limit (e.g., the temperature of a memory system having a higher power limit may increase more quickly than the temperature of a memory system having a lower power limit). If the temperature of the memory system exceeds a threshold, the memory system may enter a thermal throttle mode in which the memory system significantly limits performance (e.g., data rate) to reduce the temperature. In some cases, a memory system may use a fixed power limit set during manufacture of the system, which may result in suboptimal management of entering thermal throttle mode. For example, if the memory system is operating in a relatively high-temperature environment, the memory system may enter the thermal throttle mode relatively quickly, which may decrease system performance. Alternatively, if the memory system is operating in a relatively low-temperature environment, the fixed power limit may artificially lower the performance of the device.

As described herein, a memory system may dynamically change the power envelope (e.g., by changing a power limit for system operation, such as an upper power limit) during operation based on operating conditions associated with the memory system to improve memory performance. For example, the memory system may measure the time before entering a thermal throttle mode (e.g., time between receiving a burst of commands and entering the thermal throttle mode). If the time is relatively short (e.g., less than a threshold), the memory system may decrease the power limit, which may cause the time before entering the thermal throttle mode after a subsequent burst of host activity (e.g., burst of commands, operations, or the like) to increase. For example, the memory system may operate within the reduced power limit, which may reduce a rate at which the temperature of the memory system increases, thereby increasing a time to thermal throttle. Alternatively, if the time to thermal throttle is relatively long (e.g., greater than a threshold), the memory system may increase the power limit, which may cause the time before entering the thermal throttle mode after a subsequent burst of host activity to decrease. For example, the memory system may operate within the increased power limit, which may increase a rate at which the temperature of the memory system increases, thereby increasing a time to thermal throttle. These techniques may allow the memory system to adapt the power limit based on the environment of the memory system, which may increase the amount of data transferred before entering the thermal throttle mode, thereby improving performance of the memory system.

In addition to applicability in memory systems as described herein, power envelope modification based on time to thermal throttle may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data through-put or access speeds, decreasing communication times, or increasing memory capacity or density, among other performance indicators, may improve user experience or appeal. Implementing the techniques described herein may improve the performance of electronic devices by optimizing the data transfer rate of electronic devices before entering a thermal throttle mode, which may decrease processing or latency times, improve response times, or otherwise improve user experience, among other benefits.

Features of the disclosure are illustrated and described in the context of systems, devices, and circuits. Features of the disclosure are further illustrated and described in the context of timing diagrams, a process flow, and flowcharts.

FIG. 1 shows an example of a system 100 that supports power envelope modification for memory systems based on time to thermal throttle in accordance with examples as disclosed herein. The system 100 includes a host system 105 coupled with a memory system 110. The system 100 may be included in a computing device such as a desktop computer, a laptop computer, a network server, a mobile device, a vehicle (e.g., train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support power envelope modification for memory systems based on time to thermal throttle. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some cases, a memory system 110 may dynamically change a power limit of the memory system based on operating conditions associated with the memory system 110 to improve memory performance. For example, the memory system 110 may measure the time before entering a thermal throttle mode (e.g., time from receiving a burst of host activity, such as one or more commands from a host system 105, and entering an active mode to entering the thermal throttle mode). If the time is relatively short (e.g., less than a threshold), the memory system 110 may decrease the power limit, which may cause the time before entering the thermal throttle mode during a subsequent burst of host activity to increase. Alternatively, if the time is relatively long (e.g., greater than a threshold), the memory system 110 may increase the power limit, which may cause the time before entering the thermal throttle mode during a subsequent burst of host activity to decrease. These techniques may allow the memory system to adapt the power limit based on the environment of the memory system 110, which may increase the amount of data transferred before entering the thermal throttle mode, which may in turn improve the memory system performance.

Figure 2A:
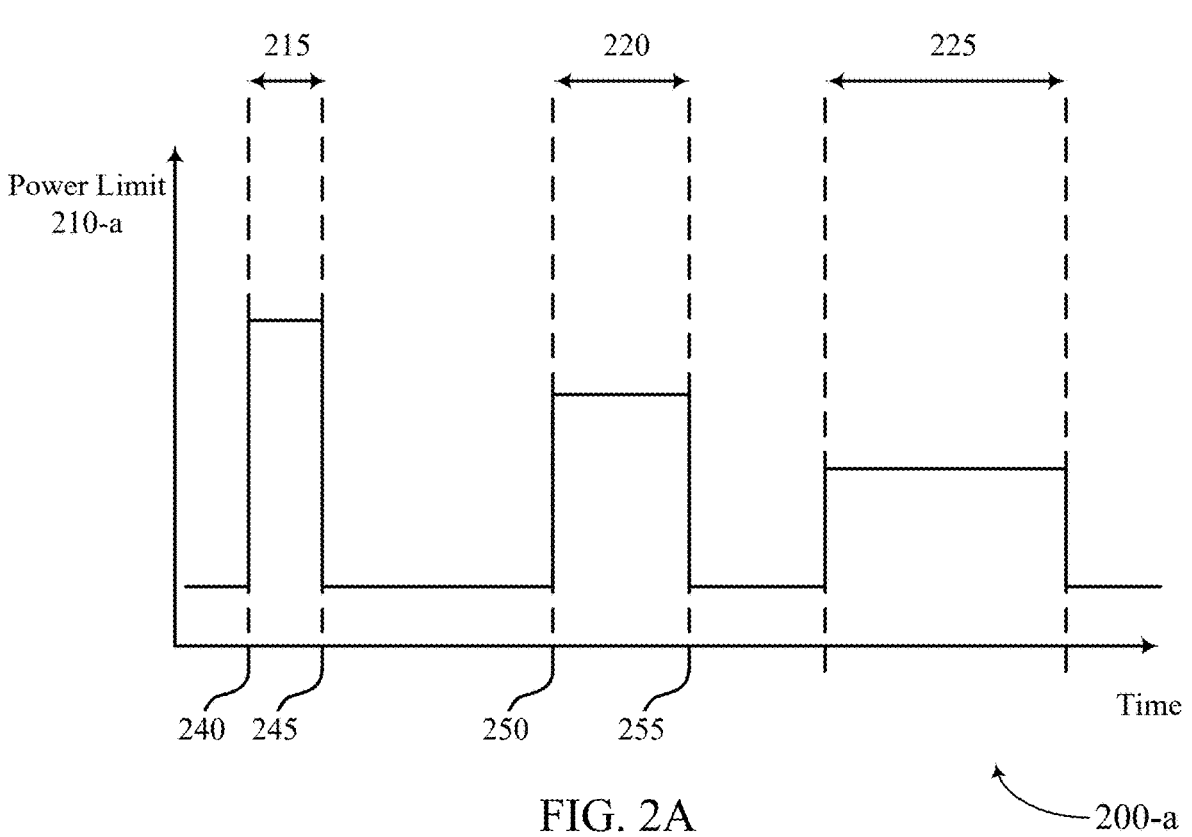
FIGS. 2A and 2B show examples of timing diagrams that support power envelope modification based on time to thermal throttle in accordance with examples as disclosed herein.
Figure 2B:
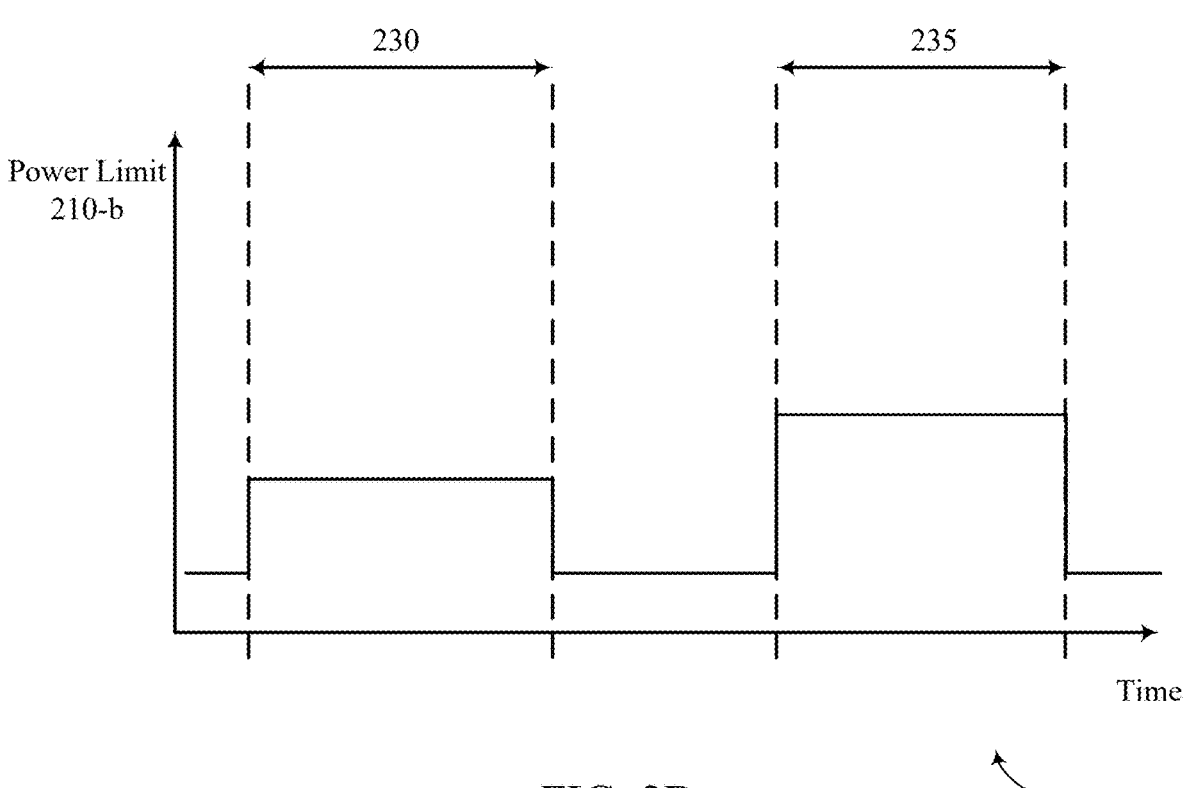

FIGS. 2A and 2B show examples of a timing diagram 200-a and a timing diagram 200-b that support power envelope modification for memory systems based on time to thermal throttle in accordance with examples as disclosed herein. The timing diagrams 200-a and 200-b may illustrate a power limit 210 over time for a memory system, such as the memory system 110 as described with reference to FIG. 1. The power limit 210 may correspond to a threshold amount of power usage (e.g., may correspond to a power threshold) of the memory system. the memory system may limit power consumption based on the power limit 210, such that an amount of power consumed by the memory system does not exceed the power limit 210 at any given time. In some examples, the memory system may dynamically adjust the power limit 210 to improve system performance.

FIG. 2A illustrates a first example of a timing diagram 200-a. In this example, prior to the time 240, the memory system may operate in an idle mode. In some cases, while in the idle mode, the memory system may not perform commands received from a host system or may perform relatively few commands received from the host system. At the time 240, the memory system may receive a burst of host activity and may transition from the idle mode to an active mode in response to the burst of host activity. In some examples, the burst of host activity may include receiving one or more commands from the host system. For example, the memory system may transition to the active mode in response to receiving a threshold quantity of commands from the host system within a threshold time.

During at least a portion of the active mode, the memory system may begin performing operations in response to the one or more received commands. As part of performing the operations, the memory system may limit power consumption (e.g., by limiting or reducing memory system performance, by limiting or reducing a data rate of the memory system) such that the power consumed by the memory device does not exceed the power limit 210-a. For example, the memory system may insert one or more delays, which may delay operations of the memory system (e.g., delay performing aspects of access commands, such as read commands and write commands) and thus reduce the power consumption of the memory system. Additionally, or alternatively, the memory system may reduce a clock speed, such as the by reducing the frequency of an internally generated clock signal, to reduce performance of the memory system and thus reduce the power consumption of the memory system.

As the memory system performs the received commands, the temperature of the memory system may increase, for example due to heat generated by internal operations in excess of heat dissipated, such as heat dissipated through heat sinks or other cooling methods. In some examples, the memory system may monitor the temperature. For example, the memory system may include one or more temperature sensors to measure a temperature at various locations within the memory system. If one or more parameters or metrics of the temperature satisfy a threshold, the memory system may initiate a thermal throttle mode. For example, if the temperature exceeds a threshold, if a rate of change of the temperature exceeds a threshold (e.g., if the memory system is heating too quickly), or a combination thereof, the memory system may, at the time 245, initiate the thermal throttle mode. In some examples, the temperature of the memory system may be based on the temperature of one or more components of the memory system, such as the temperature of the memory system controller 115, the temperature of the one or more memory devices 130, or a combination thereof (e.g., an average).

While in the thermal throttle mode, the memory system may significantly reduce performance, which may in turn reduce the temperature of the memory system. For example, the memory system may reduce the clock speed (e.g., a greater reduction relative to the lesser reduction in clock speed used to limit the power consumption), may reduce operating voltages, or may take other actions to reduce the amount of heat generated by the memory system. The memory system may remain in the thermal throttle mode until a temperature of the memory system decreases below a threshold temperature.

In some cases, because data transferred prior to entering the thermal throttle mode may be associated with a higher data rate than during the thermal throttle mode, user experience may be improved by increasing the amount of data (e.g., read and write data) transferred by the memory system prior to entering the thermal throttle mode. Additionally, time to enter the thermal throttle mode may change as environmental conditions of the memory system change. For example, the environmental temperature of the memory system may change, the rate at which the memory system dissipates heat may change (e.g., due to changes in airflow, heatsinks, and so on), or a combination thereof. Accordingly, the memory system may dynamically adjust the power limit 210 to increase the quantity of data transferred prior to entering the thermal throttle mode. For example, if the memory system is adequately cooled, the time before the memory system enters the thermal throttle mode may be relatively long, and the memory system may increase the power limit 210 to increase performance without entering the thermal throttle mode too quickly. Alternatively, if the memory system is insufficiently cooled, the memory system may decrease the power limit 210 to increase the duration until entering the thermal throttle mode, and thus increase the amount of data transferred before entering the thermal throttle mode. The memory system may determine whether to increase or decrease the power limit 210 by measuring the time to enter the thermal throttle mode.

For example, in response to receiving the burst of host activity at the time 240, the memory system may start a timer. The memory system may stop the timer in response to entering the thermal throttle mode. Based on the value of the timer (e.g., based on the length of the duration 215, based on the difference between the time 245 and the time 240), the memory system may determine the time to enter the thermal throttle mode.

The memory system may compare the duration 215 to a threshold. By way of example, the memory system may determine that the duration 215 is less than the threshold, and the memory system may decrease the power limit 210-a. In some cases, the memory system may utilize a mapping (e.g., a look-up table) to adjust the power limit 210-a. For example, the memory system may access a threshold mapping table stored at the memory system. The threshold mapping may include a set of mappings between candidate durations (e.g., times to thermal throttle) and values of the power limit 210-a. Additionally, or alternatively, the threshold mapping may include a set of mappings between the candidate durations and adjustments to the value of the power limit 210-a. For example, the threshold mapping may indicate, for a given duration, an amount to adjust the value of the power limit 210-a (e.g., an amount to increase or decrease the power limit). The memory system may compare the measured duration with the candidate durations, for example by determining whether the measured duration falls within a range of a candidate duration, and thus determine the associated adjusted power limit.

In some cases, the memory system may exit the thermal throttle mode, for example after the temperature of the memory system has fallen below a threshold, after a threshold duration of time, or a combination thereof. The memory system may transition to the idle mode to await a subsequent burst of host activity. For example, at the time 250, the memory system may receive a second set of one or more commands and, in response, transition to the active mode. The memory system may initiate and start the timer, and may operate in the active mode and limit the power consumption in accordance with the reduced power limit 210-a. Because of the reduced power limit 210-a, the duration 220 (e.g., the duration of time from transitioning into the active mode at the time 250 and entering the thermal throttle mode at the time 255) may increase. For example, because the memory system operates with reduced power consumption, a rate at which the temperature of the memory system increases may be reduced relative to a rate of temperature increase when the memory system operates with increased power consumption.

The memory system may continue adjusting the power limit 210-a throughout runtime. For example, the memory system may compare the duration 220 with the threshold, may compare the duration 220 with the threshold mapping table, or both. By way of example, the memory system may determine that the duration 220 is less than the threshold, and may decrease the power limit 210-a. In some cases, the memory system may not adjust the power limit 210-a. For example, for a duration 225 corresponding to a third burst of host activity, the memory system may determine that the amount of data transferred prior to thermal throttle may not be increased by adjusting the power limit 210-a, such as by determining that the duration 225 is within a range (e.g., based on the threshold mapping table). Additionally, or alternatively, the memory system may increase the power limit 210.

FIG. 2B illustrates a second example timing diagram 200-b. The timing diagram 200-b may illustrate aspects of the memory system after a change in environment of the memory system, such as a decreased environmental temperature, improved airflow or cooling capacity, or both. In such cases, the memory system may determine that increasing the power limit 210-b may increase the amount of data transferred before entering the thermal throttle mode. For example, the memory system may determine that the duration 230 exceeds the threshold, and the memory system may increase the power limit 210-b. As a result, for a duration 235 corresponding to a subsequent burst of host activity, the memory system may increase the power limit 210-b and transfer an increased amount of data before entering the thermal throttle mode, compared with the duration 230.

For example, if the memory system increases the power limit, the memory system may increase performance during the second duration and the second duration may decrease (e.g., the memory system may enter the thermal throttle mode more quickly), which may allow for an increased data rate and thus increased user experience. Alternatively, if the memory system decreases the power limit, the memory system may decrease performance during the second duration and the second duration may increase, which may allow for an increased amount of data transferred before entering thermal throttle and thus increased user experience.

In some cases, the memory system may store a value representing the power limit 210, for example as a global variable or other configurable parameter and may adjust the value to adjust the power limit 210. Additionally, or alternatively, the memory system may maintain a standard or default value for the power limit 210. For example, the memory system may initialize the value to the default value, such as during a power-on or initialization procedure, and may configure the value throughout run-time, in accordance with examples as described herein.

Figure 3:
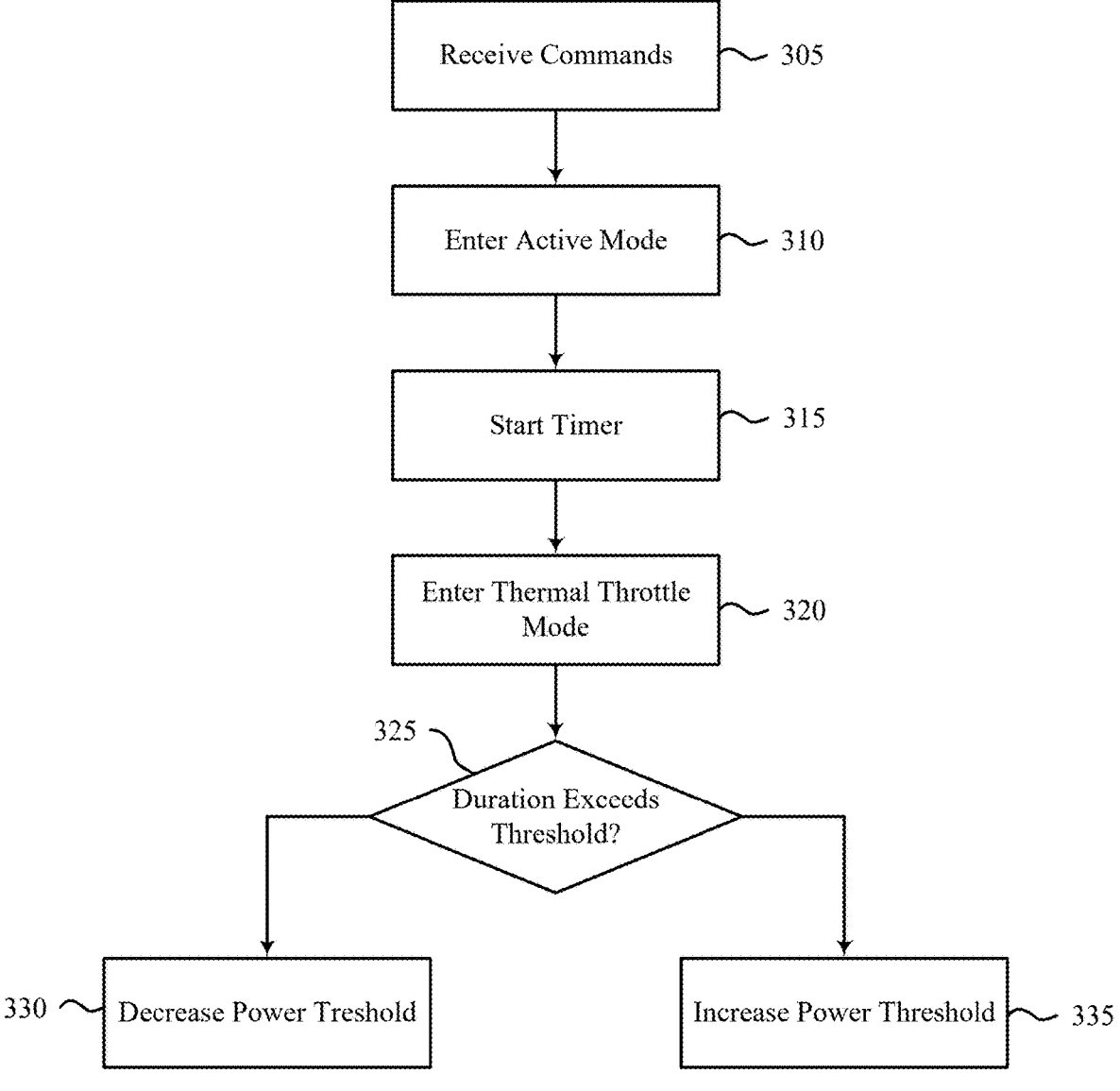
FIG. 3 shows an example of a process flow that supports power envelope modification based on time to thermal throttle in accordance with examples as disclosed herein.

FIG. 3 shows an example of a process flow 300 that supports power envelope modification for memory systems based on time to thermal throttle in accordance with examples as disclosed herein. In some examples, a memory system, which may be an example of the memory system 110 as described with reference to FIG. 1, may implement aspects of the process flow 300 using a memory system controller (e.g., a memory system controller 115). In the following description of process flow 300, the operations may be performed in a different order than the order shown. For example, specific operations may also be left out of process flow 300, or other operations may be added to process flow 300.

The process flow 300 may illustrate a method to dynamically adjust a power limit of the memory system based on a duration of time for the memory system to enter a thermal throttle mode. In some cases, the memory system may measure a measure the duration of time after entering an active mode, and may adjust the power limit based on the measured time.

For example, at 305, the memory system may receive one or more commands from a host system, such as the host system 105 as described with reference to FIG. 1. In response to receiving the one or more commands, the memory system may, at 310, transition from an idle mode to an active mode. In some cases, the memory system may transition into the active mode based on one or more parameters or metrics of received commands. For example, the memory system may transition to the active mode if the quantity of the commands exceeds a threshold or if a quantity of data associated with the commands exceeds a threshold, among other examples.

The memory system may operate in the active mode (e.g., by performing the received commands) during a first time period that begins at a first time associated with the burst of host activity (e.g., at 305). The active mode may be referred to as a first mode, in some examples. The memory system may limit power consumption based on a first value of the power limit during the duration. For example, the memory system may insert one or more delays (e.g., may cause the memory system to delay operations for a period), may reduce the clock speed of the memory system, or both, such that the power consumption may be maintained below the first value of the power limit.

At 315, the memory system may initiate a timer. In some cases, the memory system may initiate the timer concurrently with transitioning to the active mode. Additionally, or alternatively, the memory system may initiate the timer prior to transitioning to the active mode, or after transitioning to the active mode (e.g., in response to transitioning to the active mode).

As the memory system operates in the active mode, the temperature of the memory system may rise, for example due to heat generated by the memory system as part of performing the received commands. In some examples, the memory system may monitor the temperature and, if one or more parameters or metrics of the temperature satisfy a threshold, the memory system may initiate a thermal throttle mode. For example, if the temperature exceeds a threshold, if a rate of change of the temperature exceeds a threshold (e.g., if the memory system is heating too quickly), or a combination thereof, the memory system may, at 320, initiate the thermal throttle mode.

While in the thermal throttle mode, the memory system may significantly reduce performance, which may in turn reduce the temperature of the memory system. For example, the memory system may greatly reduce the clock speed (e.g., relative to the lesser reduction in clock speed used to limit the power consumption), may reduce operating voltages, or may take other actions to reduce the amount of heat generated by the memory system.

In response to entering the thermal throttle mode, the memory system may stop the timer. Accordingly, the value of the timer may represent the duration of time between transitioning to the active mode (e.g., beginning a burst of host activity) and entering the thermal throttle mode. In some cases, a relatively short duration may suggest that the memory system entered the thermal throttle mode relatively quickly, and that the total amount of data transferred before entering the thermal throttle mode may be increased if the duration were longer. Alternatively, a relatively long duration may suggest that the memory system may increase performance without entering the thermal throttle mode too quickly.

The memory system may adjust the value of the power limit based on the measured duration. For example, at 325, the memory system may compare the duration to a threshold. If the duration is less than the threshold (e.g., if the duration is relatively short), the memory system may, at 330, decrease the value of the power limit. For example, the memory system may adjust the power limit from the first value to a second value that is less than the first value. If the duration exceeds the threshold (e.g., if the duration is relatively long), the memory system may, at 335, increase the value of the power limit. For example, the memory system may adjust the power limit from the first value to a second value that is greater than the first value.

Additionally, or alternatively, the memory system may utilize a mapping (e.g., a look-up table) to adjust the power limit. For example, the memory system may access a threshold mapping table stored at the memory system. The threshold mapping may include a set of mappings between candidate durations and values of the power limit. Additionally, or alternatively, the threshold mapping may include a set of mappings between the candidate durations and adjustments to the value of the power limit. For example, the threshold mapping may indicate, for a given duration, an amount to adjust the value of the power limit (e.g., an amount to increase or decrease the power limit). The memory system may compare the measured duration with the candidate durations, for example by determining whether the measured duration falls within a range of a candidate duration, and thus determine the associated adjusted power limit.

In some cases, the memory system may exit the thermal throttle mode, for example after the temperature of the memory system has fallen below a threshold, after a threshold duration of time, or a combination thereof. The memory system may transition to the idle mode to await a subsequent burst of host activity. For example, the memory system may receive a second set of one or more commands and, in response, transition to the active mode. The memory system may operate in the active mode and limit the power consumption in accordance with the adjusted power limit. Because of the adjusted power limit, a second duration until entering the thermal throttle mode (e.g., the duration of time from transitioning into the active mode the second time and entering the thermal throttle mode the second time) may correspondingly change. For example, if the memory system increases the power limit, the memory system may increase performance during the second duration and the second duration may decrease (e.g., the memory system may enter the thermal throttle mode more quickly), which may allow for an increased data rate and thus increased user experience. Alternatively, if the memory system decreases the power limit, the memory system may decrease performance during the second duration and the second duration may increase, which may allow for an increased amount of data transferred before entering thermal throttle and thus increased user experience.

Figure 4:
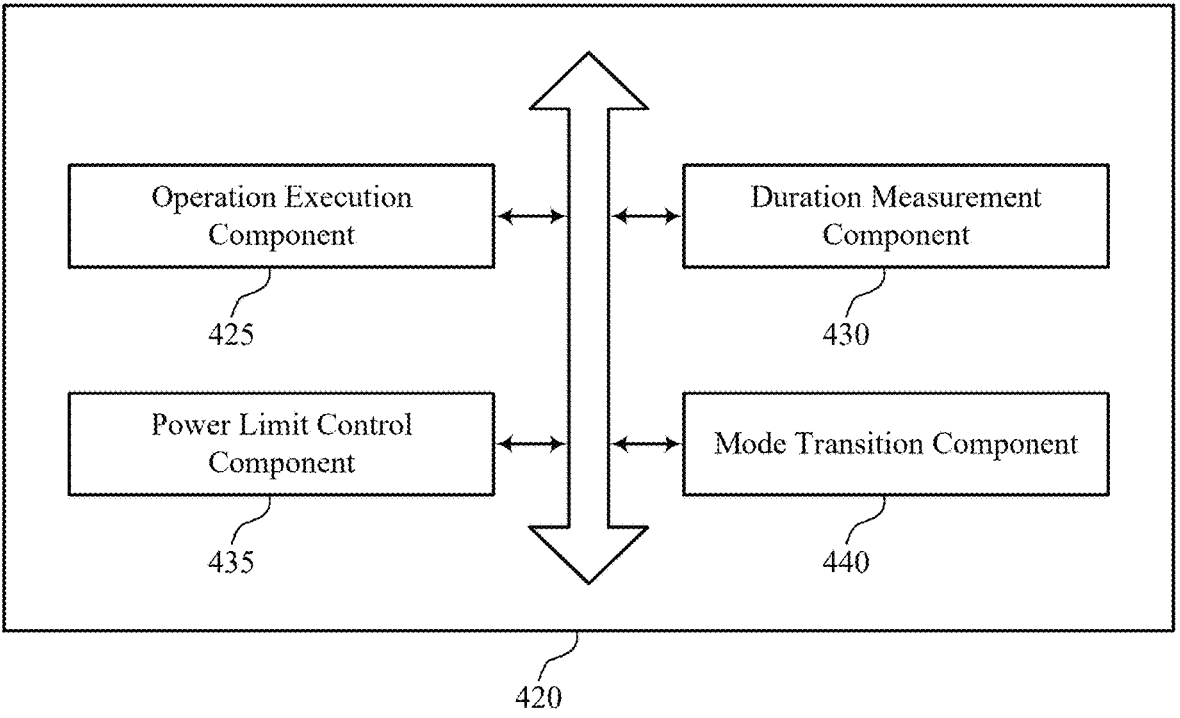
FIG. 4 shows a block diagram of a memory system that supports power envelope modification based on time to thermal throttle in accordance with examples as disclosed herein.

FIG. 4 shows a block diagram 400 of a memory system 420 that supports power envelope modification for memory systems based on time to thermal throttle in accordance with examples as disclosed herein. The memory system 420 may be an example of aspects of a memory system as described with reference to FIGS. 1 through 3. The memory system 420, or various components thereof, may be an example of means for performing various aspects of power envelope modification for memory systems based on time to thermal throttle as described herein. For example, the memory system 420 may include an operation execution component 425, a duration measurement component 430, a power limit control component 435, a mode transition component 440, or any combination thereof. Each of these components, or components of subcomponents thereof (e.g., one or more processors, one or more memories), may communicate, directly or indirectly, with one another (e.g., via one or more buses).

The operation execution component 425 may be configured as or otherwise support a means for operating the memory system in accordance with a first mode during a first time period that begins at a first time, where a power limit for the memory system has a first value during the first time period. The duration measurement component 430 may be configured as or otherwise support a means for measuring a duration between the first time and a second time associated with the memory system entering a thermal throttle mode, where the memory system enters the thermal throttle mode based at least in part on a temperature of the memory system exceeding a threshold temperature. The power limit control component 435 may be configured as or otherwise support a means for adjusting the power limit to a second value based at least in part on the measured duration between the first time and the second time associated with the memory system entering the thermal throttle mode.

In some examples, the mode transition component 440 may be configured as or otherwise support a means for transitioning, at the first time, from operating the memory system in accordance with an idle mode to operating the memory system in accordance with the first mode based at least in part on receiving one or more commands from a host system, where the first mode is an active mode.

In some examples, the duration measurement component 430 may be configured as or otherwise support a means for initiating, at the first time, a timer based at least in part on operating the memory system in the first mode. In some examples, the duration measurement component 430 may be configured as or otherwise support a means for stopping, at the second time, the timer based at least in part on the memory system entering the thermal throttle mode, where measuring the duration is based at least in part on a value of the timer.

In some examples, to support adjusting the power limit to the second value, the power limit control component 435 may be configured as or otherwise support a means for reducing the power limit from the first value to the second value that is less than the first value based at least in part on the measured duration being less than a threshold duration.

In some examples, to support adjusting the power limit to the second value, the power limit control component 435 may be configured as or otherwise support a means for increasing the power limit from the first value to the second value that is greater than the first value based at least in part on the measured duration being greater than a threshold duration.

In some examples, the power limit control component 435 may be configured as or otherwise support a means for accessing a threshold mapping table stored at the memory system for the measured duration, where the threshold mapping table indicates mappings between each duration of a set of one or more candidate durations associated with the thermal throttle mode and a respective value of the power limit, and where adjusting the power limit to the second value is based at least in part on identifying that the measured duration is mapped to the second value in the threshold mapping table.

In some examples, to support operating in accordance with the first mode, the power limit control component 435 may be configured as or otherwise support a means for modifying a clock speed for operations of the memory system during the first time period based at least in part on the first value of the power limit, where an amount of power consumed by the memory system while operating in the first mode is less than the first value of the power limit based at least in part on modifying the clock speed.

In some examples, to support operating in accordance with the first mode, the power limit control component 435 may be configured as or otherwise support a means for inserting one or more delays to operations of the memory system during the first time period based at least in part on the first value of the power limit, where an amount of power consumed by the memory system while operating in the first mode is less than the first value of the power limit based at least in part on inserting the one or more delays.

In some examples, the mode transition component 440 may be configured as or otherwise support a means for transitioning, at a third time based at least in part on the temperature of the memory system decreasing below the threshold temperature, from the thermal throttle mode to the first mode or an idle mode of the memory system. In some examples, the operation execution component 425 may be configured as or otherwise support a means for operating the memory system in accordance with the first mode or the idle mode for a second time period that starts at the third time, where the power limit for the memory system has the second value during the second time period.

In some examples, a first data rate of the memory system in the first mode is greater than a second data rate of the memory system in the thermal throttle mode.

In some examples, the described functionality of the memory system 420, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 420, or various components thereof, may be implemented at least in part by instructions (e.g., stored in memory, non-transitory computer-readable medium) executable by such at least one processor.

FIG. 5 shows a flowchart illustrating a method 500 that supports power envelope modification for memory systems based on time to thermal throttle in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include operating the memory system in accordance with a first mode during a first time period that begins at a first time, where a power limit for the memory system has a first value during the first time period. In some examples, aspects of the operations of 505 may be performed by an operation execution component 425 as described with reference to FIG. 4.

At 510, the method may include measuring a duration between the first time and a second time associated with the memory system entering a thermal throttle mode, where the memory system enters the thermal throttle mode based at least in part on a temperature of the memory system exceeding a threshold temperature. In some examples, aspects of the operations of 510 may be performed by a duration measurement component 430 as described with reference to FIG. 4.

At 515, the method may include adjusting the power limit to a second value based at least in part on the measured duration between the first time and the second time associated with the memory system entering the thermal throttle mode. In some examples, aspects of the operations of 515 may be performed by a power limit control component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for operating the memory system in accordance with a first mode during a first time period that begins at a first time, where a power limit for the memory system has a first value during the first time period; measuring a duration between the first time and a second time associated with the memory system entering a thermal throttle mode, where the memory system enters the thermal throttle mode based at least in part on a temperature of the memory system exceeding a threshold temperature; and adjusting the power limit to a second value based at least in part on the measured duration between the first time and the second time associated with the memory system entering the thermal throttle mode.

Aspect 2: The method, apparatus, or non-transitory computer-readable medium of aspect 1, further including operations, features, circuitry, logic, means, or instructions, or any combination thereof for transitioning, at the first time, from operating the memory system in accordance with an idle mode to operating the memory system in accordance with the first mode based at least in part on receiving one or more commands from a host system, where the first mode is an active mode.

Aspect 3: The method, apparatus, or non-transitory computer-readable medium of any of aspects 1 through 2, further including operations, features, circuitry, logic, means, or instructions, or any combination thereof for initiating, at the first time, a timer based at least in part on operating the memory system in the first mode and stopping, at the second time, the timer based at least in part on the memory system entering the thermal throttle mode, where measuring the duration is based at least in part on a value of the timer.

Aspect 4: The method, apparatus, or non-transitory computer-readable medium of any of aspects 1 through 3, where adjusting the power limit to the second value includes operations, features, circuitry, logic, means, or instructions, or any combination thereof for reducing the power limit from the first value to the second value that is less than the first value based at least in part on the measured duration being less than a threshold duration.

Aspect 5: The method, apparatus, or non-transitory computer-readable medium of any of aspects 1 through 4, where adjusting the power limit to the second value includes operations, features, circuitry, logic, means, or instructions, or any combination thereof for increasing the power limit from the first value to the second value that is greater than the first value based at least in part on the measured duration being greater than a threshold duration.

Aspect 6: The method, apparatus, or non-transitory computer-readable medium of any of aspects 1 through 5, further including operations, features, circuitry, logic, means, or instructions, or any combination thereof for accessing a threshold mapping table stored at the memory system for the measured duration, where the threshold mapping table indicates mappings between each duration of a set of one or more candidate durations associated with the thermal throttle mode and a respective value of the power limit, and where adjusting the power limit to the second value is based at least in part on identifying that the measured duration is mapped to the second value in the threshold mapping table.

Aspect 7: The method, apparatus, or non-transitory computer-readable medium of any of aspects 1 through 6, where operating in accordance with the first mode includes operations, features, circuitry, logic, means, or instructions, or any combination thereof for modifying a clock speed for operations of the memory system during the first time period based at least in part on the first value of the power limit, where an amount of power consumed by the memory system while operating in the first mode is less than the first value of the power limit based at least in part on modifying the clock speed.

Aspect 8: The method, apparatus, or non-transitory computer-readable medium of any of aspects 1 through 7, where operating in accordance with the first mode includes operations, features, circuitry, logic, means, or instructions, or any combination thereof for inserting one or more delays to operations of the memory system during the first time period based at least in part on the first value of the power limit, where an amount of power consumed by the memory system while operating in the first mode is less than the first value of the power limit based at least in part on inserting the one or more delays.

Aspect 9: The method, apparatus, or non-transitory computer-readable medium of any of aspects 1 through 8, further including operations, features, circuitry, logic, means, or instructions, or any combination thereof for transitioning, at a third time based at least in part on the temperature of the memory system decreasing below the threshold temperature, from the thermal throttle mode to the first mode or an idle mode of the memory system and operating the memory system in accordance with the first mode or the idle mode for a second time period that starts at the third time, where the power limit for the memory system has the second value during the second time period.

Aspect 10: The method, apparatus, or non-transitory computer-readable medium of any of aspects 1 through 9, where a first data rate of the memory system in the first mode is greater than a second data rate of the memory system in the thermal throttle mode.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processing system (e.g., one or more processors, one or more controllers, control circuitry processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processor. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component"

subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method by a memory system, comprising:
   operating the memory system in accordance with a first mode during a first time period that begins at a first time, wherein a power limit for the memory system has a first value during the first time period;
   measuring a duration between the first time and a second time associated with the memory system entering a thermal throttle mode, wherein the memory system enters the thermal throttle mode based at least in part on a temperature of the memory system exceeding a threshold temperature; and
   adjusting the power limit to a second value based at least in part on the measured duration between the first time and the second time associated with the memory system entering the thermal throttle mode.

2. The method of claim 1, further comprising:
   transitioning, at the first time, from operating the memory system in accordance with an idle mode to operating the memory system in accordance with the first mode based at least in part on receiving one or more commands from a host system, wherein the first mode is an active mode.

3. The method of claim 1, further comprising:

initiating, at the first time, a timer based at least in part on operating the memory system in the first mode; and stopping, at the second time, the timer based at least in part on the memory system entering the thermal throttle mode, wherein measuring the duration is based at least in part on a value of the timer.

4. The method of claim 1, wherein adjusting the power limit to the second value comprises:

reducing the power limit from the first value to the second value that is less than the first value based at least in part on the measured duration being less than a threshold duration.

5. The method of claim 1, wherein adjusting the power limit to the second value comprises:

increasing the power limit from the first value to the second value that is greater than the first value based at least in part on the measured duration being greater than a threshold duration.

6. The method of claim 1, further comprising:

accessing a threshold mapping table stored at the memory system for the measured duration, wherein the threshold mapping table indicates mappings between each duration of a set of one or more candidate durations associated with the thermal throttle mode and a respective value of the power limit, and wherein adjusting the power limit to the second value is based at least in part on identifying that the measured duration is mapped to the second value in the threshold mapping table.

7. The method of claim 1, wherein operating in accordance with the first mode comprises:

modifying a clock speed for operations of the memory system during the first time period based at least in part on the first value of the power limit, wherein an amount of power consumed by the memory system while operating in the first mode is less than the first value of the power limit based at least in part on modifying the clock speed.

8. The method of claim 1, wherein operating in accordance with the first mode comprises:

inserting one or more delays to operations of the memory system during the first time period based at least in part on the first value of the power limit, wherein an amount of power consumed by the memory system while operating in the first mode is less than the first value of the power limit based at least in part on inserting the one or more delays.

9. The method of claim 1, further comprising:

transitioning, at a third time based at least in part on the temperature of the memory system decreasing below the threshold temperature, from the thermal throttle mode to the first mode or an idle mode of the memory system; and operating the memory system in accordance with the first mode or the idle mode for a second time period that starts at the third time, wherein the power limit for the memory system has the second value during the second time period.

10. The method of claim 1, wherein a first data rate of the memory system in the first mode is greater than a second data rate of the memory system in the thermal throttle mode.

11. A non-transitory computer-readable medium storing code, the code comprising instructions executable by one or more processors to:

operate a memory system in accordance with a first mode during a first time period that begins at a first time, wherein a power limit for the memory system has a first value during the first time period;

measure a duration between the first time and a second time associated with the memory system entering a thermal throttle mode, wherein the memory system enters the thermal throttle mode based at least in part on a temperature of the memory system exceeding a threshold temperature; and adjust the power limit to a second value based at least in part on the measured duration between the first time and the second time associated with the memory system entering the thermal throttle mode.

12. The non-transitory computer-readable medium of claim 11, wherein the instructions are further executable by the one or more processors to:

transition, at the first time, from operating the memory system in accordance with an idle mode to operating the memory system in accordance with the first mode based at least in part on receiving one or more commands from a host system, wherein the first mode is an active mode.

13. The non-transitory computer-readable medium of claim 11, wherein the instructions are further executable by the one or more processors to:

initiate, at the first time, a timer based at least in part on operating the memory system in the first mode; and stop, at the second time, the timer based at least in part on the memory system entering the thermal throttle mode, wherein measuring the duration is based at least in part on a value of the timer.

14. The non-transitory computer-readable medium of claim 11, wherein, to adjust the power limit to the second value, the instructions are executable by the one or more processors to:

reduce the power limit from the first value to the second value that is less than the first value based at least in part on the measured duration being less than a threshold duration.

15. The non-transitory computer-readable medium of claim 11, wherein, to adjust the power limit to the second value, the instructions are executable by the one or more processors to:

increase the power limit from the first value to the second value that is greater than the first value based at least in part on the measured duration being greater than a threshold duration.

16. The non-transitory computer-readable medium of claim 11, wherein the instructions are further executable by the one or more processors to:

access a threshold mapping table stored at the memory system for the measured duration, wherein the threshold mapping table indicates mappings between each duration of a set of one or more candidate durations associated with the thermal throttle mode and a respective value of the power limit, and wherein adjusting the power limit to the second value is based at least in part on identifying that the measured duration is mapped to the second value in the threshold mapping table.

17. The non-transitory computer-readable medium of claim 11, wherein, to operate in accordance with the first mode, the instructions are executable by the one or more processors to:

modify a clock speed for operations of the memory system during the first time period based at least in part on the first value of the power limit, wherein an amount of power consumed by the memory system while operating in the first mode is less than the first value of the power limit based at least in part on modifying the clock speed.

18. The non-transitory computer-readable medium of claim 11, wherein, to operate in accordance with the first mode, the instructions are executable by the one or more processors to:

insert one or more delays to operations of the memory system during the first time period based at least in part on the first value of the power limit, wherein an amount of power consumed by the memory system while operating in the first mode is less than the first value of the power limit based at least in part on inserting the one or more delays.

19. The non-transitory computer-readable medium of claim 11, wherein the instructions are further executable by the one or more processors to:

transition, at a third time based at least in part on the temperature of the memory system decreasing below the threshold temperature, from the thermal throttle mode to the first mode or an idle mode of the memory system; and operate the memory system in accordance with the first mode or the idle mode for a second time period that starts at the third time, wherein the power limit for the memory system has the second value during the second time period.

20. A memory system, comprising:

one or more memory devices; and processing circuitry coupled with the one or more memory devices and configured to cause the memory system to:

operate the memory system in accordance with a first mode during a first time period that begins at a first time, wherein a power limit for the memory system has a first value during the first time period;

measure a duration between the first time and a second time associated with the memory system entering a thermal throttle mode, wherein the memory system enters the thermal throttle mode based at least in part on a temperature of the memory system exceeding a threshold temperature; and adjust the power limit to a second value based at least in part on the measured duration between the first time and the second time associated with the memory system entering the thermal throttle mode.

\* \* \* \* \*